United States Patent
Seyedi

(10) Patent No.: US 10,985,841 B1
(45) Date of Patent: Apr. 20, 2021

(54) WAVELENGTH DIVISION MULTIPLEXING WAVELENGTH TRANSLATOR

(71) Applicant: Hewlett Packard Enterprise Development LP, Houston, TX (US)

(72) Inventor: Mir Ashkan Seyedi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/775,939

(22) Filed: Jan. 29, 2020

(51) Int. Cl.
| | |
|---|---|
| *H04J 14/02* | (2006.01) |
| *H04B 10/25* | (2013.01) |
| *H04B 10/516* | (2013.01) |
| *H04B 10/27* | (2013.01) |
| *H04B 10/50* | (2013.01) |
| *H04B 10/29* | (2013.01) |

(52) U.S. Cl.
CPC ......... *H04B 10/2589* (2020.05); *H04B 10/27* (2013.01); *H04B 10/516* (2013.01); *H04J 14/02* (2013.01); *H04B 10/29* (2013.01); *H04B 10/50* (2013.01); *H04B 10/506* (2013.01)

(58) Field of Classification Search
CPC .. H04B 10/2589; H04B 10/27; H04B 10/516; H04B 10/29; H04B 10/50; H04B 10/506; H04J 14/02
USPC ................................... 398/43–103, 173–181
See application file for complete search history.

(56) References Cited

U.S. PATENT DOCUMENTS

| | | | |
|---|---|---|---|
| 6,381,384 B2 | 4/2002 | Solheim et al. | |
| 6,947,670 B1 | 9/2005 | Korotky et al. | |
| 7,769,294 B2 | 8/2010 | Takahashi | |
| 7,856,182 B2 | 12/2010 | Boden | |
| 8,731,401 B2 * | 5/2014 | Chen ................... | H04J 14/0254 398/46 |
| 2002/0154857 A1 * | 10/2002 | Goodman ............ | G02B 6/2713 385/24 |
| 2008/0069570 A1 * | 3/2008 | Dallesasse .............. | H04J 14/02 398/139 |

(Continued)

OTHER PUBLICATIONS

Chung et al, SerDes chips for 100Gbps Dual Polarization DQPSK, May 2009, OSA/OFC/NFOEC, All Document. (Year: 2009).*

(Continued)

*Primary Examiner* — Dibson J Sanchez
(74) *Attorney, Agent, or Firm* — Hewlett Packard Enterprise Patent Department

(57) ABSTRACT

Examples herein relate to wavelength division multiplexing optical interconnects. In particular, implementations herein relate to an optical interconnect that include a wavelength translator. The optical interconnect includes a first transmitter configured to modulate, combine, and transmit multi-wavelength optical signals, the modulated optical signals having a first number of optical channels, a first data rate per wavelength, and a first wavelength spacing between neighboring modulated optical signals. The optical interconnect includes a wavelength translator configured to convert the modulated optical signals such that the converted modulated optical signals have at least one or more of: a second number of optical channels different from the first number of optical channels, a second data rate per wavelength different from the first data rate per wavelength, or a second wavelength spacing different from the first wavelength spacing.

17 Claims, 3 Drawing Sheets

(56) References Cited

U.S. PATENT DOCUMENTS

| | | | | |
|---|---|---|---|---|
| 2008/0205437 | A1* | 8/2008 | Cole | H04J 3/047 370/464 |
| 2010/0021166 | A1* | 1/2010 | Way | H04J 14/0256 398/79 |
| 2011/0033188 | A1* | 2/2011 | Elbers | H04J 14/02 398/79 |
| 2014/0029951 | A1* | 1/2014 | Handelman | H04B 10/506 398/91 |
| 2016/0094308 | A1* | 3/2016 | Liboiron-Ladouceur | H04J 14/028 398/44 |
| 2018/0294887 | A1* | 10/2018 | Rahn | H04J 14/0256 |
| 2018/0348456 | A1* | 12/2018 | Ho | G02B 6/4256 |

OTHER PUBLICATIONS

Cole, 100 Gbs and Beyond Ethernet Optical Interfaces, Jul. 2010, OECC, All Document. (Year: 2010).*

Scott, Increasing Fiber Capacity with CWDM, Sep. 2017, Omnitron Systems, All Document. https://scte-sandiego.org/uploads/3/5/4/0/35405245/cwdm-dwdm_scte_san_diego_technical_session_9-27-17.pdf (Year: 2017).*

Datasheet, Quad Multi Rate Transponder, Apr. 2012, Transmode, All Document. http://www.cbnetworks.fr/datasheet/pdf/DS_TM_TPQMR_C.pdf (Year: 2012).*

\* cited by examiner

US 10,985,841 B1

WAVELENGTH DIVISION MULTIPLEXING WAVELENGTH TRANSLATOR

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Wavelength division multiplexing (WDM) is useful for increasing communication bandwidth by combining and sending multiple different data channels or wavelengths from one or more optical sources over an optical fiber. However, there are several competing or different standards of optical wavelength grids in the optical communication space. Therefore, there remains a need for improved optical interconnects with the ability to enable optical wavelength translation between different standards or optical wavelength grids.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
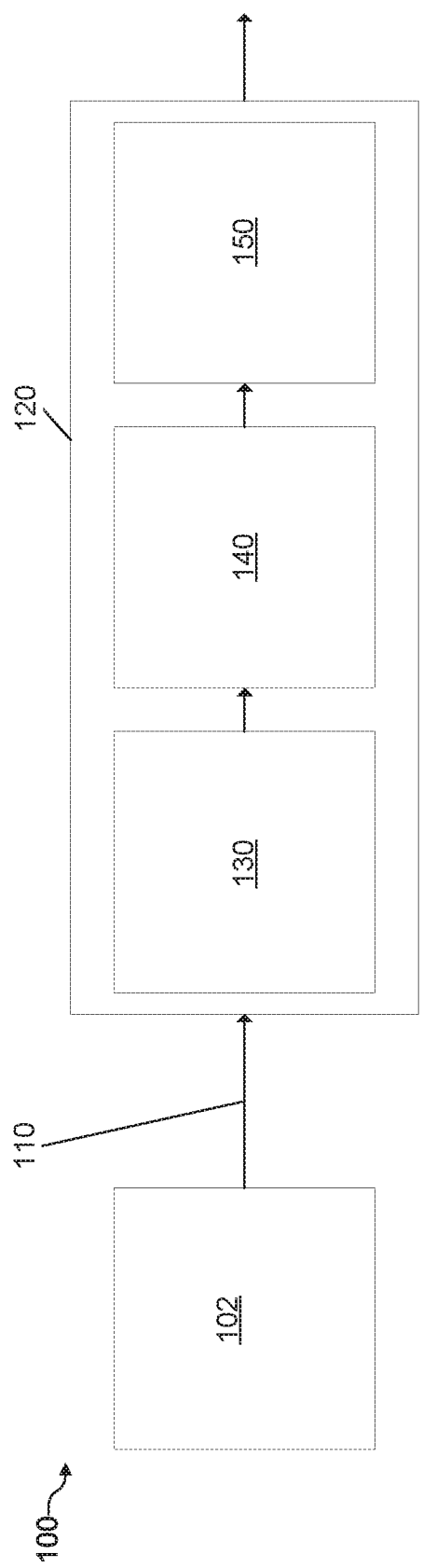
FIG. 1 schematically illustrates a block diagram of an example optical interconnect including a wavelength translator according to the present disclosure.

The present disclosure describes optical interconnects, links, or topologies that enable optical wavelength translation from one optical wavelength grid to another optical wavelength grid (e.g., between different optical standards or wavelength grids). As there are various optical standards and wavelength grids, optical interconnects with wavelength translators provide an optical link between send and receive pairs on corresponding nodes as described herein and can provide backwards or forwards compatibility between the various wavelength grids of the send and receive pairs. For example, the optical interconnects can provide coarse wavelength division multiplexing (CWDM) to dense wavelength division multiplexing (DWDM) translation or vice versa. In particular, the wavelength translator can receive an arbitrary number of channels of optical signals, the optical signals having a specific wavelength spacing and data rate per wavelength, and output (e.g., convert, translate, map) the optical signals to another wavelength spacing, channel count, and/or data rate per wavelength.

In particular, optical interconnects are provided herein that include a WDM wavelength translator. In some implementations, the optical interconnect includes a first transmitter configured to modulate, combine, and transmit multi-wavelength optical signals, the modulated optical signals having a first number of optical channels, a first data rate per wavelength, and a first wavelength spacing between neighboring (e.g., adjacent) modulated optical signals. The optical interconnect includes a wavelength translator configured to convert the modulated optical signals such that the converted modulated optical signals have at least one or more of: a second number of optical channels different from the first number of optical channels, a second data rate per wavelength different from the first data rate per wavelength, or a second wavelength spacing different from the first wavelength spacing. In some implementations, the wavelength translator is configured to allow one or more wavelengths or wavelength channels to pass through without translation (e.g., without be converted). In yet other implementations, a first set of wavelengths are converted and a second set of wavelengths are allowed to pass through without translation simultaneously.

WDM is useful for increasing communication bandwidth by sending multiple data channels down a single fiber. For example, a 100 gigabit per second (Gbps) link can be constructed by using four channels operating at 25 Gbps per channel, with each channel operating at a different wavelength. A multiplexer is used to join the signals together before transmitting them down the waveguide or fiber, and a demultiplexer is subsequently used to separate the signals to be converted into electrical signals by respective photodetectors for further processing. CWDM technology generally operates with wavelengths or channels in a wavelength grid between 1270 nm and 1620 nm with 20 nm spacing between neighboring or adjacent channels. DWDM technology generally operates with wavelengths or channels in a wavelength grid between 1528 nm and 1563 nm, referred to as the C-Band or between 1280 nm and 1360 nm, so-called O-Band, with 0.8 nm or 0.4 nm spacing between neighboring or adjacent channels. Therefore, as generally understood, DWDM allows more combined wavelengths (e.g., information or data) to be transferred over an optical fiber relative to CWDM.

A "node" as described herein may refer to a network switch, board, chip, system, server, or other type of electronic device in which optical signals may be carried, transmitted, or propagated therefrom by an optical interconnect or link. An "optical fiber" as described herein can refer to a single optical fiber (e.g., including a core and a cladding) to provide unidirectional optical communication, can refer to a bidirectional pair of optical fibers (e.g., each including a core and a cladding) to provide both transmit and receive communications in an optical network, or can refer to a multi-core fiber, such that a single cladding can encapsulate a plurality of single-mode cores. Optical fibers can extend contiguously and uninterrupted between nodes or send/receive pairs (e.g., via pass-through connections) or include two or more fibers connected via fiber-to-fiber connections such that the fibers function or perform as a single fiber.

Figure 2:
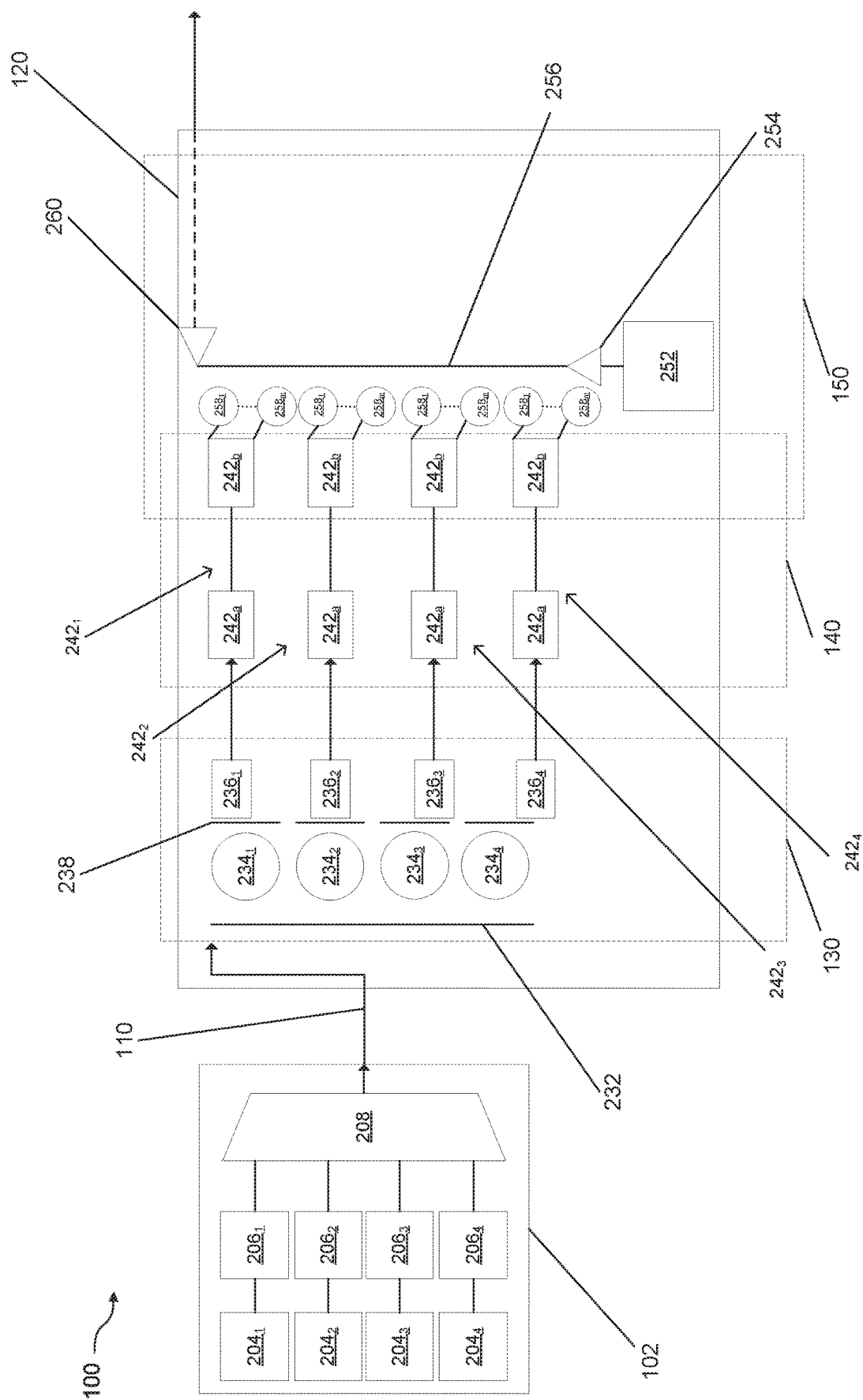
FIG. 2 schematically illustrates a block diagram of another example optical interconnect of FIG. 1 including various components according to the present disclosure.

FIGS. 1-2 illustrate examples of an optical interconnect 100 and components thereof according to the present disclosure. The optical interconnect 100 includes a first transmitter 102. The first transmitter 102 is configured to modulate, combine, and transmit multi-wavelength optical signals. The modulated optical signals have a first number of optical channels, a first data rate per wavelength, and a first wavelength spacing between neighboring modulated optical signals.

The optical interconnect 100 further includes a wavelength translator 120 and an optical waveguide 110 (e.g., an optical fiber). The optical waveguide 110 couples the first transmitter 102 to the wavelength translator 120 such that the modulated optical signals can be propagated together from the first transmitter 102 to the wavelength translator 120 across the optical waveguide 110.

The wavelength translator 120 is configured to convert the modulated optical signals from the first transmitter 102 such that the converted modulated optical signals have at least one or more of: a second number of optical channels different from the first number of optical channels, a second data rate per wavelength different from the first data rate per wavelength, or a second wavelength spacing different from the first wavelength spacing. In some implementations, the wavelength translator 120 is configured to allow one or more modulated optical signals (e.g., wavelengths or wavelength channels) to pass through without translation (e.g., without being converted such that they maintain the first data rate per wavelength and first wavelength spacing).

As described in further detail below with respect to FIG. 2, the wavelength translator 120 includes a demultiplexer 130, an integrated circuit 140 having a serializer/deserializer (SerDes), and a second transmitter 150. The demultiplexer 130 is configured to demultiplex or separate the modulated optical signals from the first transmitter and convert the modulated optical signals into corresponding electrical signals. The SerDes of the integrated circuit 140 is configured to receive the electrical signals from the demultiplexer 130 and convert the electrical signals. The second transmitter 150 is coupled to an output of the SerDes and is configured to receive the converted electrical signals. The second transmitter 150 provides multi-wavelength optical signals upon which the converted electrical signals from the SerDes can be encoded thereon to generate the converted modulated optical signals (e.g., having the second number of optical channels, second data rate per wavelength, and/or second wavelength spacing). As described in further detail below with respect to FIG. 3, the converted modulated optical signals from the wavelength translator 120 are configured to be transmitted to a receiver (e.g., on another node or device relative to the first transmitter 102).

With respect to the implementation of the optical interconnect 100 illustrated in FIG. 2, the first transmitter 102 includes one or more optical sources 204 (e.g., up to an "n" number of optical sources 204). For example, the first transmitter 102 can include two or more single-wavelength optical sources 204 (e.g., VCSELs) identified individually as optical sources $204_1$ to $204_n$ configured to emit different respective wavelengths of light or optical signals. In the illustrated implementation, the first transmitter 102 includes four optical sources $204_1$ to $204_4$ (e.g., n=4) each transmitting a single wavelength or optical channel. However, in other implementations, n can equal 4, 8, 16, 32, 64, 128, or any value therebetween (e.g., n corresponding to the number of optical channels or usable wavelengths to be transmitted). In other implementations, the first optical source 204 can include one or more multi-wavelength optical sources 204. For example, the optical source 204 can be a comb laser configured to generate a plurality of different laser lines or wavelengths (e.g., a comb laser to generate the "n" number of wavelengths or optical channels).

The first transmitter 102 further includes one or more optical modulators 206 (e.g., an "n" number of optical modulators 206). In the illustrated embodiment, n=4 and the first transmitter 102 includes four optical modulators 206 (e.g., identified individually as optical modulators $206_1$ to $206_4$) to receive and filter the different wavelengths of light or optical signals from the respective optical sources 204. The first transmitter 102 can have a same number of modulators 206 as different or usable wavelengths or optical channels of the respective optical sources 204. The optical modulators 206 can modulate or otherwise encode data in the form of electrical signals (e.g., from one or more electrical output sources or ports) onto the respective wavelengths of light from the optical sources 204 to generate the modulated optical signals. A multiplexer 208 can then be used to combine the modulated optical signals from each modulator 206 for transmission across the optical waveguide 110.

While illustrated as separate components, in other implementations, the optical modulators 206 and multiplexer 208 can be combined or otherwise integrated together. For example, the first transmitter 102 can include an input bus waveguide configured to couple the emitted light from the respective optical sources 204 to the optical waveguide 110. The optical modulators 206 can include a set or array of ring resonators coupled to the input bus waveguide, the input bus waveguide configured to receive the multiple wavelengths of light from the optical sources 204. Each ring resonator can be tuned to a different resonant wavelength corresponding to a different channel or wavelength of the multiple wavelengths emitted from the respective optical sources 204.

The ring resonators are each configured to be tuned to a single peak wavelength of the emitted light different from the other ring resonators. For example, resonance properties of each ring resonator can be precisely tuned to select the specific wavelength by varying the radius of each ring or by tuning the cladding index. Tuning can be accomplished via thermal tuning (e.g., providing a controllable micro-heater by each ring resonator), bias-tuning, or a combination of both. While referring specifically to ring resonators, in other examples, ring resonators as described herein can be replaced with microdisks or other suitable traveling wave resonators.

When light of the appropriate wavelength is coupled from the input bus waveguide to a corresponding ring resonator, constructive interference causes a buildup in intensity over multiple round-trips through the ring resonator. The ring resonators can encode the electrical signals as discussed above to the different wavelengths (e.g., modulate via tuning circuitry and a CMOS driver) coupled to each respective ring resonator. The optical signals from each ring resonator with encoded electrical signals (e.g., the modulated optical signals) can be coupled back into the input bus waveguide and recombined (e.g., multiplexed) to be propagated across the optical waveguide 110 to the wavelength translator 120. Therefore, the ring resonators together with the input bus waveguide can be configured as the optical modulator 206 and multiplexer 208 wherein each ring resonator acts as an individual optical modulator 206.

As discussed above, the modulated optical signals are received by the demultiplexer 130 of the wavelength translator 120. Similar to the optical modulators 206, in some implementations, the demultiplexer 130 can include a set or array of ring resonators 234 (e.g., up to "n" number of ring resonators 234). In the illustrated implementation, n=4 with the ring resonators 234 identified individually as ring resonators $234_1$ to $234_4$ corresponding to the number of demultiplexed wavelengths or the first number of optical channels) that act as filters to drop (e.g., couple in) the respective resonant wavelengths from a respective waveguide 232 coupled to an output end of the optical waveguide 110.

The set of ring resonators 234 of demultiplexer 130 receives and separates or demultiplexes the multi-wavelength modulated optical signals from optical sources 204. For example, the ring resonators 234 are configured to demultiplex the light from optical sources 204 propagated across the optical waveguide 110. Resonant wavelengths specific or corresponding to each ring resonator 234 are individually demultiplexed into respective photodetectors 236 (e.g., via "drop" or output waveguides 238 coupled to respective photodetectors $236_1$ to $236_4$) to convert the modulated optical signals into electrical signals for further processing (e.g., conversion or translation) by the wavelength translator 120.

Thus, each of the ring resonators 234 can "drop" or otherwise filter individual or single wavelengths of light from the multiplexed modulated multi-wavelength optical signal received across the optical waveguide 110 (e.g., from respective ring resonators of the first transmitter 102). Similar to the ring resonators or optical modulators 206 of the first transmitter 102, the set of ring resonators 234 of the wavelength translator 230 can be tuned as well. Further, while illustrated as separate components, in other examples, the ring resonators 234 and the photodetectors 236 can be integrated together. For example, a set of micro-rings configured as wavelength-selective photodetectors can be used.

The electrical signals of each wavelength or channel from the demultiplexer 130 is input into or received by the SerDes of the integrated circuit 140. As described above, the SerDes of the integrated circuit 140 is configured to receive the electrical signals from the demultiplexer 130 and convert the electrical signals. The converted electrical signals are then encoded onto optical signals provided by the second transmitter to generate the converted modulated optical signals.

As illustrated in the implementation of FIG. 2, the SerDes of the integrated circuit 140 can also include up to an n number of individual SerDes modules or blocks 242 (e.g., identified individually as SerDes blocks $242_1$ to $242_4$ where n corresponds to the number of optical channels or demultiplexed wavelengths from the first transmitter 102). Each of the respective SerDes blocks $242_1$ to $242_4$ is configured to receive the electrical signals from respective photodetectors $236_1$ to $236_4$ and convert the electrical signals such that the resulting converted modulated optical signals have the second number of optical channels, second data rate per wavelength, and/or second wavelength spacing.

Each of the SerDes blocks 242 includes corresponding serializing and de-serializing blocks 242a and 242b to convert the respective electrical signals to be encoded onto the multi-wavelength optical signals provided by the second transmitter 150. In some implementations, a single optical channel or wavelength of light from the first transmitter 102 can be de-serialized by the SerDes blocks into multiple optical channels or wavelengths of light. For example, each of the SerDes blocks 242 can convert an input single wavelength or optical channel from the first transmitter 102 having a data rate of 100 Gb/s into ten corresponding wavelengths or optical channels each having a data rate of 10 Gb/s. In other implementations, input and output optical channels remain the same after passing through the SerDes blocks (e.g., the first number of optical channels is equal to the second number of optical channels).

As described above, in other implementations, one or more of the SerDes blocks 242 can be configured to allow the single optical channel or wavelength of light to pass through without being converted or otherwise deserialized into multiple channels and/or changing the data rate. In such implementations, the wavelengths of light passing through such a SerDes block 242 maintains the same input spacing, channel count, and data rate. The wavelengths of lights passing through the other SerDes blocks 242 can still be converted or maintained as discussed above. This allows the wavelength translator 120 to be selective with respect to input wavelengths or channels to be converted or maintained without conversion.

As described above, the second transmitter 150 is coupled to an output of the SerDes blocks 242 and is configured to receive the converted electrical signals. The second transmitter 150 provides multi-wavelength optical signals upon which the converted electrical signals from the SerDes blocks 242 can be encoded thereon to generate the converted modulated optical signals (e.g., having the second number of optical channels, second data rate per wavelength, and/or second wavelength spacing). In the illustrated implementation, the second transmitter 150 includes one or more optical sources 252. The optical source 252 can be a multi-wavelength optical source (e.g., a comb laser) configured to provide the multi-wavelength optical signals. In some implementations, the second wavelength spacing can be set or determined by second transmitter 150. For example, the channel spacing or wavelength grid spacing of the multi-wavelength optical source 252 determines or sets the spacing of the converted modulated optical signals (e.g., the second wavelength spacing).

The optical source 252 can be coupled to one or more input waveguides 256 via optical coupler(s) 254. The input waveguide 256 is further coupled to second arrays or sets of modulators or ring resonators 258. The number of second arrays or sets of ring resonators 258 corresponds to the number of SerDes blocks 242. The ring resonators 258 operate in a similar manner as ring resonators of optical modulators 206 and can be tuned to different optical wavelengths from optical source 252. The converted electrical signals from SerDes blocks 242 can be encoded onto the different optical wavelengths or signals to generate the converted modulated optical signals.

Each of the second sets of ring resonators 258 includes one or more ring resonators (e.g., up to an "m" number of ring resonators) corresponding to the number of optical channels each single wavelength from the first transmitter 102 can be converted into. For example, when m=10, single wavelengths from first transmitter 102 can be converted or deserialized into or up to ten different optical channels or wavelengths. In the illustrated embodiment, when all four single wavelengths from the first transmitter 102 (e.g., the first number of optical channels is four, n=4) are converted into ten different optical channels or wavelengths (e.g., m=10), the second number of optical channels is equal to forty. In other implementations, m=4, 8, 16, 32, 64, 128, or any value therebetween.

As described above, the date rate per wavelength and/or wavelength spacing can also be changed instead of or in addition to the number of optical channels. For example, when m=n or output of the de-serializer blocks 242b are equal to input of serializer blocks 242a, the first number of optical channels is equal to the second number of optical channels. However, in such implementations, the data rate per wavelength can be changed or converted such that the second data rate per wavelength is different from the first data rate per wavelength. For example, the first data rate per wavelength can be greater than or less than the second data rater per wavelength. In other implementations, the wavelength spacing can be changed or converted such that the second wavelength spacing is different from the first wavelength spacing, in addition to or instead of the data rate per wavelength. For example, the first wavelength spacing (e.g., input wavelength spacing) can be in a CWDM grid or domain and the second wavelength spacing (e.g., output wavelength spacing) can be in a DWDM grid or domain or vice versa.

As discussed above, the modulated optical signals from the first transmitter 102 have the first number of optical channels, the first data rate per wavelength, and the first wavelength spacing between neighboring modulated optical signals. For example, the first transmitter 102 can be a CWDM transmitter and the modulated optical signals within the CWDM grid. After passing through the wavelength translator 120, the modulated optical signals are converted such that the converted modulated optical signals have the second number of optical channels, the second data rate per wavelength, and/or the second wavelength spacing between neighboring modulated optical signals. For example, the second transmitter 150 can be a DWDM transmitter and the converted modulated optical signals are within the DWDM grid. Therefore, in some implementations, the optical interconnect with the wavelength translator 120 as described herein converts input modulated optical signals from the CWDM grid or domain to output modulated optical signals in the DWDM grid or domain.

Figure 3:
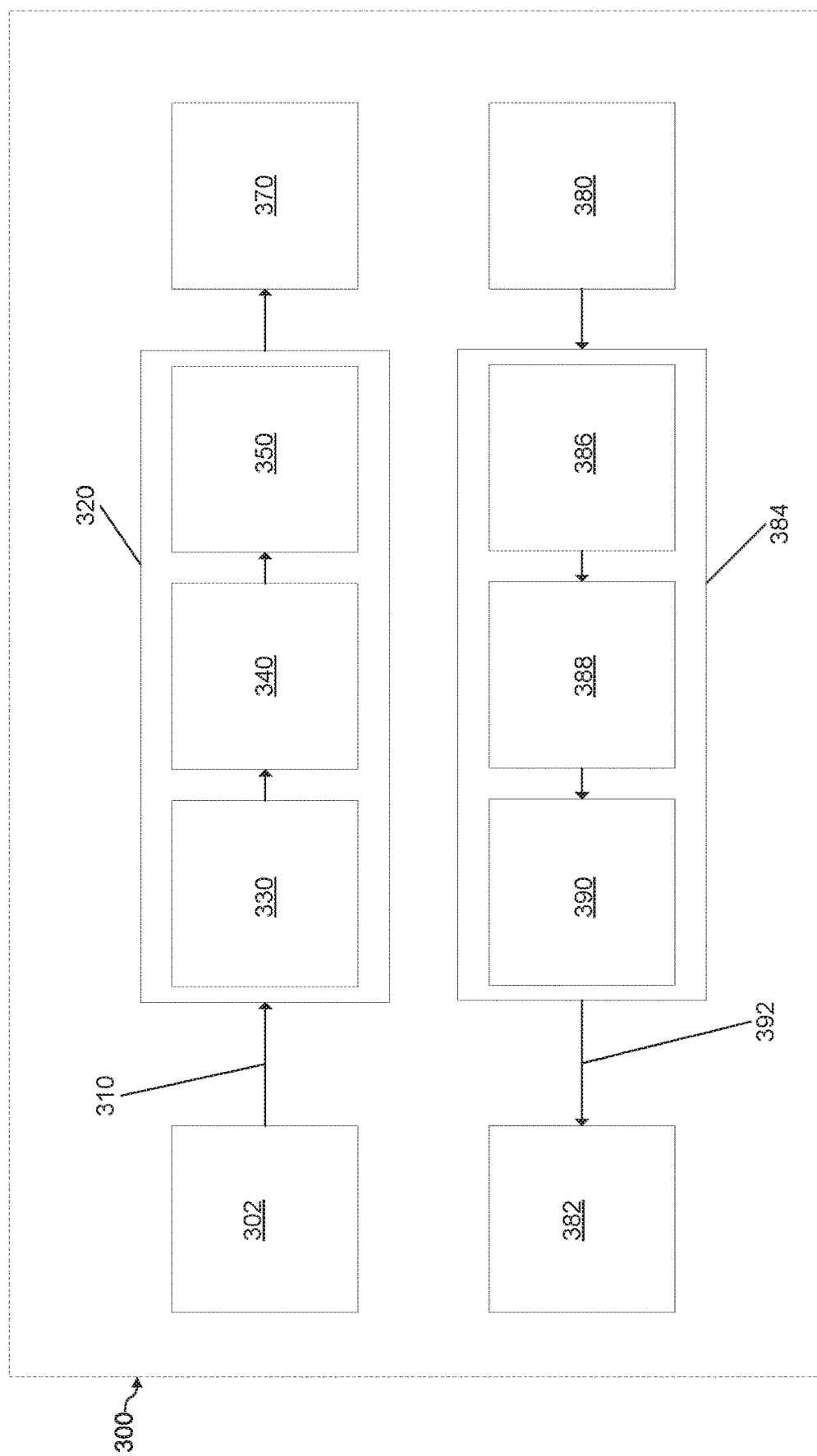
FIG. 3 schematically illustrates a block diagram of an example of a bi-directional optical link that can be formed with the optical interconnect of according to the present disclosure.

Further, in some implementations, an output end of the waveguide 256 can include an optical coupler 260 coupled to a receiver such that the converted modulated optical signals can be transmitted to the receiver as illustrated with respect to the implementation of FIG. 3.

FIG. 3 illustrates a bi-directional optical link coupling first and second nodes. The optical interconnect system 300 can include any of the features as described above with respect to optical interconnect 100, in whole or in part. For example, the bi-directional optical link 300 includes a first transmitter 302 on a first node configured to modulate, combine, and transmit multi-wavelength optical signals, the modulated optical signals having a first number of optical channels, a first data rate per wavelength, and a first wavelength spacing between neighboring modulated optical signals. The bi-directional optical link 300 also includes a wavelength translator 320 configured to receive the modulated optical signals from the first transmitter and convert the modulated optical signals.

The wavelength translator 320 includes a demultiplexer 330 configured to demultiplex the modulated optical signals from the first transmitter 302 and convert the modulated optical signals into corresponding electrical signals. The wavelength translator 320 also includes an integrated circuit 340 having a SerDes configured to receive the electrical signals from the demultiplexer and convert the electrical signals.

The wavelength translator 320 further includes a second transmitter 350 coupled to an output of the SerDes and configured to receive the converted electrical signals and provide multi-wavelength optical signals upon which the converted electrical signals from the SerDes can be encoded thereon to generate the converted modulated optical signals. The converted modulated optical signals have at least one or more of: a second number of optical channels different from the first number of optical channels, a second data rate per wavelength different from the first data rate per wavelength, or a second wavelength spacing different from the first wavelength spacing. The bi-directional optical link 300 also includes a receiver 370 on a second node coupled to an output of the wavelength translator 320 and configured to receive the converted modulated optical signals.

The bi-directional optical link 300 can include a third transmitter 380 on the second node configured to modulate, combine, and transmit multi-wavelength optical signals to a second receiver 382 on the first node via a second wavelength translator 384 to provide send/receive pairs on the first and second nodes. For example, the third transmitter 380 can include one or more multi-wavelength optical sources (e.g., comb lasers). The second wavelength translator 384 is configured to convert the modulated optical signals from the third transmitter 380 such that the converted modulated optical signals received by the second receiver 382 has at least one or more of a different: number of optical channels, data rate per wavelength, or wavelength spacing relative to the modulated optical signals transmitted by the third transmitter 380.

In some implementations, the modulated optical signals from the third transmitter 380 have the second number of optical channels, data rate per wavelength, and/or wavelength spacing relative to the converted modulated optical signals to be received by the second receiver 382 which have the first number of optical channels, data rate per wavelength, and/or wavelength spacing. The second wavelength translator 384 can include an intermediary receiver 386 to receive the modulated optical signals from the third transmitter 380 and demultiplex the optical signals.

The intermediary receiver 386 receives the optical signals from the third transmitter 380, demultiplexes, and converts them into electrical signals (e.g., with sets or arrays or ring resonators coupled to an input waveguide). The electrical signals are then configured to be output to and translated or converted by an integrated circuit 388 including a SerDes in a similar or identical manner as the integrated circuit 140 with SerDes described above. The integrated circuit 388 including the SerDes is configured to receive and convert the electrical signals (e.g., with separate respective SerDes blocks) to the appropriate electrical signals (e.g., such that they can be encoded onto optical signals from a fourth transmitter 390 to generate the converted modulated optical signals.

The fourth transmitter 390 can include multiple single-wavelength sources (e.g., VCSELs) to generate the optical signals to be modulated by the converted/appropriate electrical signals from the integrated circuit 388 with SerDes to generate the converted modulated optical signals. The converted modulated optical signals are multiplexed or otherwise combined and transmitted to the second receiver 382 on the first node. The bi-directional optical link 300 can further include an optical waveguide 310 coupling the first transmitter 302 to the wavelength translator 320 and a second optical waveguide 392 coupling the second receiver 382 to the second wavelength translator 384.

As described herein, the bi-directional optical link 300 with wavelength translators is provided between send/receive pairs on the first and second nodes (e.g., the first transmitter 302 and second receiver 382 on the first node respectively coupled via the bi-directional optical link 300 with the third transmitter 380 and receiver 370 on the second node). The send/receive pair on the first node can operate in a different wavelength grid or domain (e.g., different number of optical channels, data rate per wavelength, and/or channel spacing) relative to the send/receive pair on the second node. For example, the first transmitter 302 on the first node can be a CWDM transmitter and the receiver 370 on the second node can be a DWDM receiver. The third transmitter 380 on the second node can be a DWDM transmitter and the second receiver 382 on the first node can be a CWDM receiver. Thus, the bi-directional optical link 300 as described herein enables wavelength translation from one optical grid or domain to another (e.g., between send/receive pairs on respective nodes).

In the foregoing description, numerous details are set forth to provide an understanding of the subject disclosed herein. However, implementations may be practiced without some or all of these details. Other implementations may include additions, modifications, or variations from the details discussed above. It is intended that the appended claims cover such modifications and variations. The specification and drawings are, accordingly, to be regarded as illustrative rather than restrictive. Additionally, in the interest of clarity and to avoid unnecessarily obscuring the description, other details describing well-known structures and systems often associated with optical interconnects (e.g., driver circuitry, ASICs, gratings, etc.), have not been set forth herein in the description of the various examples of the present disclosure It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect (e.g., having additional intervening components or elements), between two or more elements, nodes, or components; the coupling or connection between the elements can be physical, mechanical, logical, optical, electrical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. An optical interconnect comprising:
    a first transmitter configured to modulate, combine, and transmit multi-wavelength optical signals, the modulated optical signals having a first number of optical channels, a first data rate per wavelength, and a first wavelength spacing between neighboring modulated optical signals;
    a wavelength translator and an optical waveguide coupling the first transmitter to the wavelength translator such that the modulated optical signals can be propagated from the first transmitter to the wavelength translator across the optical waveguide, the wavelength translator configured to convert the modulated optical signals such that the converted modulated optical signals have at least one or more of: a second number of optical channels different from the first number of optical channels, a second data rate per wavelength different from the first data rate per wavelength; or a second wavelength spacing different from the first wavelength spacing, the wavelength translator comprising:
        a demultiplexer configured to demultiplex the modulated optical signals from the first transmitter and convert the modulated optical signals into corresponding electrical signals;
        an integrated circuit comprising a serializer/deserializer (SerDes) configured to receive the electrical signals from the demultiplexer and convert the electrical signals; and
        a second transmitter coupled to an output of a SerDes and configured to receive the converted electrical signals and provide multi-wavelength optical signals upon which the converted electrical signals from the SerDes can be encoded thereon to generate the converted modulated optical signals, wherein the second transmitter comprises one or more multi-wavelength optical sources to provide the multi-wavelength optical signals upon which the converted electrical signals from the SerDes are encoded thereon to generate the converted modulated optical signals, and wherein the second transmitter comprises two or more arrays of wavelength filters coupled to respective serializer blocks of the SerDes and the one or more multi-wavelength optical sources such that respective converted electrical signals from the SerDes can be encoded onto respective multi-wavelength optical signals from the one or more multi-wavelength optical sources, the two or more arrays of wavelength filters coupled to the one or more multi-wavelength optical sources via one or more waveguides.

2. The optical interconnect of claim 1, wherein the demultiplexer comprises an array of two or more wavelength filters with respective photodetectors coupled thereto to demultiplex the modulated optical signals from the first transmitter and convert the modulated optical signals into corresponding electrical signals.

3. The optical interconnect of claim 1, wherein the first transmitter comprises two or more single wavelength optical sources to provide the multi-wavelength optical signals.

4. The optical interconnect of claim 1, wherein the multi-wavelength optical signals of the first transmitter have wavelengths between 1270 nm and 1610 nm and wherein the first wavelength spacing is 20 nm.

5. The optical interconnect of claim 1, wherein the converted modulated optical signals have wavelengths between 1528 nm and 1563 nm or between 1280 nm and 1360 nm and wherein the second wavelength spacing is 0.8 nm or 0.4 nm.

6. The optical interconnect of claim 1, wherein the wavelength translator converts the modulated optical signals such that the converted modulated optical signals have the second number of optical channels.

7. The optical interconnect of claim 6, wherein the second number of optical channels is greater than the first number of optical channels.

8. The optical interconnect of claim 1, wherein the wavelength translator converts the modulated optical signals such that the converted modulated optical signals have the second data rate per wavelength.

9. The optical interconnect of claim 8, wherein the second data rate per wavelength is less than the first data rate per wavelength.

10. The optical interconnect of claim 1, wherein the wavelength translator converts the modulated optical signals such that the converted modulated optical signals have the second wavelength spacing.

11. The optical interconnect of claim 10, wherein the second wavelength spacing is less than the first wavelength spacing.

12. The optical interconnect of claim 1, further comprising a receiver coupled to an output of the wavelength translator and configured to receive the converted modulated optical signals.

13. A bi-directional optical link coupling first and second nodes, the bi-directional optical link comprising:
    a first transmitter on a first node configured to modulate, combine, and transmit multi-wavelength optical signals, the modulated optical signals having a first number of optical channels, a first data rate per wavelength, and a first wavelength spacing between neighboring modulated optical signals;

a wavelength translator configured to receive the modulated optical signals from the first transmitter and convert the modulated optical signals, the wavelength translator comprising:
  a demultiplexer configured to demultiplex the modulated optical signals from the first transmitter and convert the modulated optical signals into corresponding electrical signals;
  an integrated circuit comprising a serializer/deserializer (SerDes) configured to receive the electrical signals from the demultiplexer and convert the electrical signals;
  a second transmitter coupled to an output of a SerDes and configured to receive the converted electrical signals and provide multi-wavelength optical signals upon which the converted electrical signals from the SerDes can be encoded thereon to generate the converted modulated optical signals, wherein the second transmitter comprises one or more multi-wavelength optical sources to provide the multi-wavelength optical signals upon which the converted electrical signals from the SerDes are encoded thereon to generate the converted modulated optical signals, and wherein the second transmitter comprises two or more arrays of wavelength filters coupled to respective serializer blocks of the SerDes and the one or more multi-wavelength optical sources such that respective converted electrical signals from the SerDes can be encoded onto respective multi-wavelength optical signals from the one or more multi-wavelength optical sources, the two or more arrays of wavelength filters coupled to the one or more multi-wavelength optical sources via one or more waveguides; and
  a receiver on a second node coupled to an output of the wavelength translator and configured to receive the converted modulated optical signals.

14. The bi-directional optical link of claim 13, wherein the converted modulated optical signals have at least one or more of: a second number of optical channels different from the first number of optical channels, a second data rate per wavelength different from the first data rate per wavelength, or a second wavelength spacing different from the first wavelength spacing.

15. The bi-directional optical link of claim 13, further comprising a third transmitter on the second node configured to modulate, combine, and transmit multi-wavelength optical signals to a second receiver on the first node via a second wavelength translator, the second wavelength translator configured to convert the modulated optical signals from the third transmitter such that the converted modulated optical signals received by the second receiver has at least one or more of a different: number of optical channels, data rate per wavelength, or wavelength spacing relative to the modulated optical signals transmitted by the third transmitter.

16. The bi-directional optical link of claim 15, further comprising a first optical waveguide coupling the first transmitter to the wavelength translator and a second optical waveguide coupling the second receiver to the second wavelength translator.

17. The bi-directional optical link of claim 15, wherein the first transmitter is a CWDM transmitter and the receiver is a DWDM receiver.

* * * * *